United States Patent [19]

Abercrombie, Jr. et al.

[11] 4,356,093

[45] Oct. 26, 1982

[54] METHOD OF INCREASING THE EFFECTIVENESS OF OR THE EFFECTIVE PRODUCTION RATE OF A PROCESS BY INTEGRATED FEED

[75] Inventors: William F. Abercrombie, Jr., Macon; Joey G. Colwell, Jr., Thomson; Charles R. Price, Macon, all of Ga.

[73] Assignee: J. M. Huber Corporation, Locust, N.J.

[21] Appl. No.: 230,153

[22] Filed: Jan. 30, 1981

[51] Int. Cl.³ .............................................. B01D 35/06
[52] U.S. Cl. .................................... 210/695; 210/918
[58] Field of Search ....................... 55/3, 100; 209/232; 210/695, 222, 223, 918

[56] References Cited

U.S. PATENT DOCUMENTS 3,819,515 6/1974 Allen ................................ 210/695

Primary Examiner—Ivars C. Cintins
Attorney, Agent, or Firm—Harold H. Flanders; Robert L. Price

[57] ABSTRACT

A method of increasing the production or efficiency of a process in which a fluid is passed through a matrix the efficiency of which decreases with use in which the matrix is initially filled at a high rate, and an initial flow rate on the order of not more than three times the final flow rate is employed and subsequently decreased to a final flow rate which is lower than the constant flow rate which would be employed in such a process over a period of time such that the integration of the flow rate with respect to time yields a volume of product greater than or equal to the volume produced at a constant flow rate for such product. The above integrated feed program is described specifically as employed in magnetic separations.

4 Claims, 10 Drawing Figures

METHOD OF INCREASING THE EFFECTIVENESS OF OR THE EFFECTIVE PRODUCTION RATE OF A PROCESS BY INTEGRATED FEED

BACKGROUND OF THE INVENTION

The present invention relates generally to the technology of integrating the feed rate in processes which suffer from a degenerative effect with the passage of time at a given, fixed feed rate so as to increase the effectiveness of the process or the effective production rate of the process. The present invention is applicable to such processes as fixed bed ion exchange processes; mist eliminators; columnar processes containing media which is used up, depleted or otherwise rendered ineffective by the passage of material therethrough over a period of time such as absorption columns; waste water treatment beds; carbon dioxide absorption columns; and similar processes for treating fluids, gases or liquids, in which an element within the process needs to be regenerated, cleaned, recharged or regenerated with the passage of time and material therethrough or thereover.

This invention relates specifically to the technology of magnetic separation, and more specifically to a method for removing magnetically more susceptible minute particles, often present in minor concentrations as coloring impurities, from aqueous slurries of minute particles such as are obtained by dispersing clay; e.g., a crude kaolin clay, in water.

The iron content of commercial deposits of kaolin clay is generally on the order of from approximately 0.2% to 2%. Even recent publications indicate a continuing dispute as to whether the iron contaminants are in discrete form or in a combined form within a kaolin lattice structure. While the form of this iron in clay has not been definitely established, recent evidence indicates that a portion is concentrated in or associated with non-kaolin contaminants such as titanium oxides, etc. Whatever its form, iron contamination reduces brightness in clay and the degree of discoloration of the clay generally increases with the amount of iron present.

Numerous attempts to remove iron contaminants from kaolin by magnetic treatments have not been notably successful in the past. Wet magnetic separators of the prior art, such for example as described in U.S. Pat. No. 2,074,085, in general, were able to remove only a small portion of the iron present in or on kaolin. A wet magnetic separator, such as disclosed in U.S. Pat. No. 3,346,116 providing an increased field strength, increased interest in the potential of magnetic separation.

U.S. Pat. No. 3,471,011 disclosed as conditions for magnetic beneficiation of kaolin clay that a slurry of the clay in water be subjected to a high intensity magnetic field of at least 8,500 gauss and be retained in this field for from 30 seconds to 8 minutes in order to separate particles of low magnetic susceptibility from the slurry.

Magnetic separation utilizes the forces of a magnetic field gradient to cause differential movements of mineral grains through the field. Differences in the magnetic permeability of minerals or other discrete particles form the basis for separation, but separation is also influenced by particle size and mass of the mineral grains or particles, by random collisions, by the characteristics of the medium, and by the mechanical and electrical characteristics of the separator.

As noted above, the exact form of the iron and titanium oxide contaminants associated with kaolin is not entirely understood. However, it is clear that the iron contaminants are often associated with or stained on particles of minerals such as titanium dioxides contained in kaolin. These contaminants are in an extremely fine form, often of submicron size, and have a degrading effect on the whiteness and brightness of kaolin. By previous views, at least some of these contaminants were considered to be non-magnetic. For example, see Taggart, A. F.; Handbook of Mineral Dressing, p. 13-02 (1960), which shows on a scale of 100.00 taking iron as a standard, that the relative attractability of $TiO_2$ is 0.37.

In Iannicelli's Ser. No. 101,393, filed Dec. 7, 1979, there is disclosed method and apparatus, which in comparison to the prior art, are outstandingly effective in achieving magnetic separation of the low susceptibility impurities referred to. In accordance with the disclosure of said application, a container adapted to have the slurry passed therethrough is filled with magnetizable elements (such as steel wool), constituting a flux conductive matrix, which matrix serves both for diverting the slurry flow into multitudinous courses, and for concentrating magnetic flux at myriad locations therein, so as to collect the lowly susceptible particles from the slurry. This container or canister, as it is referred to therein, is disposed endwise or axially between confronting surfaces of ferromagnetic pole members, between which a magnetic field having a high intensity is produced throughout the matrix—in the general direction of the axial slurry flow through the container. Preferably the said canister is generally cylindrical in form, and is oriented between the pole members with its axis vertical, its ends being adjacent to and covered by the pole members and the flow of slurry through the canister being in the same general vertical (i.e., axial) direction as the high intensity magnetic field.

While the foregoing apparatus has, as indicated, been found highly effective for the desired purposes, it has nevertheless been observed in practice that several severe problems relating to degradation of performance have tended to occur with the apparatus. Analysis of the apparatus operation has supported the theory that such problems in part occur because of channeling and retention of clays in the matrix of the axial flow canister. In principle it would seem, and has been so proposed, that packing of the canister filter with a greater density of filtering material would result in a more uniform distribution of such filtering material, and in consequence would reduce the channeling effect, in addition to improving the ability of the filter to remove small particles. However, the increase in density of filtering material in turn tends in the axial flow filter to rapidly augment resistance to flow, to a point where unacceptable performance is evidenced. Here it may be noted that where the basic flow pattern is in the cited axial direction, the flow across each transverse cross-sectional element is the same. Accordingly, once a plugging up of the matrix begins to occur, the phenomenon will rapidly develop throughout the matrix.

The axial flow canister construction, furthermore, becomes increasingly ineffective where one endeavors to construct and utilize a large diameter separating machine based upon the principles of the invention set forth in Ser. No. 101,393. The problem of flow distribution, in particular becomes increasingly severe as the dimensions of the canister and packed filter material increase. Flow distribution in such a large diameter machine may be improved by utilizing a plurality of inlets to distribute the incoming slurry, but this in turn requires use of some type of plenum, which adds to the cost and complexity of the equipment.

This same factor of poor flow distribution is also responsible for difficulties encountered during flushing of the axial flow canisters. in particular such factor tends to make the flushing operation difficult, with consequent poor results in cleaning of the filters, or with a requirement for an inordinately long time duration for the flush cycle. Again, this flushing problem tends to become increasingly serious as the size of the separating machine, and thus of the canister utilized therein, increases.

In accordance with the foregoing, it has also been proposed in application Ser. No. 859,926 to employ radial flow patterns in order to overcome the defects mentioned above. While certain advantages are gained by the radial flow pattern, still further improvements in the operation of the system may be desired and the present invention is directed to an improvement applicable both to axial and radial flow canister. In order to describe the best mode contemplated, it will be described initially in connection with a radial flow configuration, but it is to be expressly understood that the invention is in no way limited thereto, but may be employed with both radial and axial flow configurations and without regard to the specific flow distribution scheme involved in a particular magnetic separation configuration.

In accordance with the foregoing, it may be regarded as an object of the present invention, to provide a method enabling efficient magnetic extraction of low susceptibility components present, usually at low concentrations, in slurries of very fine mineral particles, such as in aqueous clay slurries.

It is a further object of the invention to provide for such a magnetic separation method, a flow system which enables efficient treatment of slurries in high intensity magnetic fields, with programmed flow of feed to the separator, and of products, residual slurry, and by-products from the separator.

It is a still further object of the invention to provide a method for magnetic separation of low susceptibility particles from aqueous slurries of very fine particles, which enables low degradation in separator performance during use thereof, which are of high effectiveness in removal of very small particles, and which facilitate regeneration of the separating media utilized therein.

It is another object of the present invention to provide a method for magnetic extraction of low magnetic susceptibility particles from aqueous slurries of very fine particles, which enables a flow of the slurry through the separating media, enabling the use of high density in the media, with consequent further improvement in flow distribution and removal properties at the said media.

SUMMARY OF INVENTION

Now in accordance with the present invention, a container adapted to have the slurry passed therethrough in generally radial fashion, is filled with magnetizable elements constituting a flux conductive matrix which serves both for diverting the slurry flow into multitudinous courses and for concentrating magnetic flux at myriad locations therein so as to collect susceptible particles from the slurry. This container is disposed endwise, or axially, between confronting surfaces of ferromagnetic pole members, between which a magnetic field having a high intensity is produced throughout the matrix in the general direction of the longitudinal axis of the container. Preferably, the matrix elements are packed in a generally cylindrical canister, and the canister is oriented between the pole members with its longitudinal axis vertical, its ends being adjacent to and covered by the pole members and the flow of slurry through the canister being in a generally radial direction with respect to said longitudinal axis.

The collecting matrix provided in the container is composed of multitudinous elongate ferromagnetic elements of strip or ribbon-like form, which present surface irregularities and are packed in the container space with each contacting yet also spaced from others, so that as the generally radial flow of the slurry proceeds through the container the slurry is diverted into multitudinous diverse courses of minute widths, as by being caused to flow tortuously to and fro in the container between and among the matrix forming elements, while the flux of the magnetic field being applied is concentrated by angles and other surface irregularities of the matrix elements at myriad points in those courses. The matrix desirably diverts the slurry flow into courses having widths as small as practicable (e.g., less than 0.1 inch) so as to minimize the distance of travel required for weakly magnetic particles in the slurry to reach magnetized collecting sites on the matrix elements.

As noted above, while the invention is herein described in accordance with the requirement to describe a best mode in terms of a radial flow canister, it is equally applicable to axial flow canisters as will be relatively apparent to those skilled in the art. Further, it is to be noted that while the present invention is being described in terms of a process of magnetic separation it is, as will subsequently be apparent, applicable to numerous other processes as noted above wherein a matrix or collection media becomes saturated or degenerates with time and/or the passage of a fluid over or through it.

An effective collecting matrix of this nature may be provided, for example, by filling the container with fine grade stainless steel fibers of less than 50 micron diameter, which occupies a relatively small portion of the volumetric space of the container yet provides a vast number of very narrow courses or passageways for the flow of the slurry and provides in contact with the slurry a vast number of sites for locally concentrating the magnetic field and thereby fostering effective collection of the minute weakly magnetic particles from the slurry flow.

The slurry is passed through the container at a rate sufficient to prevent sedimentation yet slow enough to enable the collection and retention of weakly magnetic particles from the flow onto the matrix elements. At the same time, the matrix is subjected to a high intensity field directed axially therethrough between the pole members covering the ends of the container.

The magnetic field should have an intensity of at least 7,000 gauss within the matrix for the achievement of a separation of practical value in the brightening of slurried kaolin. An average, or mean, magnetic field intensity of at least 7,000 gauss should be maintained in the matrix throughout the distance between the confronting faces of the pole members for attainment of the full separating capability of the matrix. For the most effective separation the intensity should have a mean value of 8,500 gauss or higher, such as may be produced by maintaining a field strength in the range of 10,000 to 12,000 gauss or higher, or even as high as 20,000 gauss, at the faces of the pole members. It appears, however, that as the field strength is increased more and more above the value at which the matrix is in a state of magnetic saturation, a level is reached beyond which any increased effectiveness of the separation of the weakly susceptible particles of the slurry ceases to be attractive from an economic standpoint.

After a certain period of such flow, the effluent slurry will show an objectionably diminished extent of removal of the weakly magnetic particles. At this point, the slurry flow is discontinued and residual slurry may be rinsed out of the container, while still subjecting the matrix to the magnetic field, by flowing water through it sufficiently gentle to leave collected particles on the magnetized matrix elements. Then the magnetizing of the matrix is discontinued and the collected particles are flushed from the container by a stronger flow of water therethrough. The several effluents from the container are collected separately.

Once a desired program is defined for a given set of operating conditions, the operating cycle can be repeated continuously under the control of a system which activates and times the flows of slurry, rinse water and flush water, and delivers the resulting effluents, in proper correlation with successive periods of magnetization of the collection matrix in the container.

It is conventional in magnetic separations of the present type to employ a semi-continuous, cyclic operation as described above. The clay slurry is processed through a magnetized stainless steel wool matrix at a constant flow rate for a predetermined time. Magnetic particles are collected until matrix saturation occurs. The feed is then discontinued and the contained slurry is rinsed from the magnetized matrix. The magnet is de-energized, and the discolored magnetic particles are removed by a series of water and air or steam flushes. The complete cycle is then repeated.

The present invention operates by introducing the feed at a high rate initially and gradually decreases the feed flow rate to a lower rate. This invention increases over-all production capacity by introducing slurry at the higher velocity to a clean matrix at the beginning of the feed cycle and at a lower velocity as the end of the feed cycle and matrix saturation approaches. Thus, velocity drag forces are reduced to a minimum at the end of the feed cycle when matrix contamination is the greatest. A reduction in non-productive time is also achieved by providing a faster canister fill time.

BRIEF DESCRIPTION OF DRAWINGS

A preferred embodiment of the invention is diagrammatically illustrated, by way of example, in the accompanying drawings, in which.

DESCRIPTION OF PREFERRED EMBODIMENTS

Figure 1:
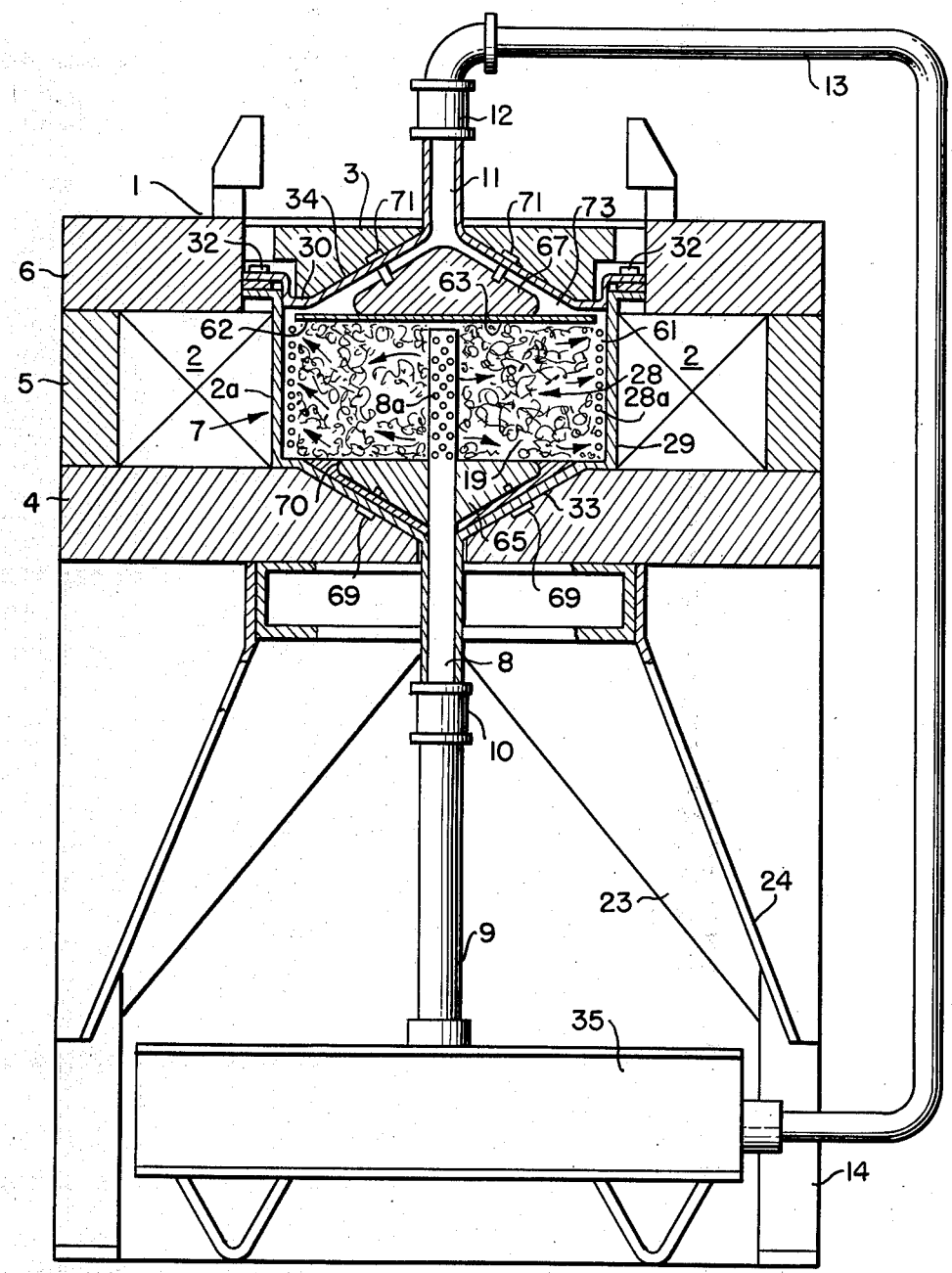
FIG. 1 is a longitudinal cross-section through a magnetic separator generally in accordance with the present invention.

The apparatus shown in FIG. 1, generally designated at 1, includes support legs 14 secured to members 23 and 24, which members in turn support the bulk of the separator. The magnetic field for the separator is preferably produced by means of an electromagnet, the coil for which is designated at 2. In order to provide the high field strengths required in accordance with the invention, coil 2 is adapted for high power dissipation (e.g., of the order of 300 KW at 3,000 amperes D.C.) and will typically comprise a hollow copper conductor, means being present (but not explicitly shown in the drawing) for pumping water or other coolant through the coil under pressure.

The magnetic circuit for apparatus 1 includes a series of generally cylindrical sections 3, 4, 5 and 6, all made of a ferromagnetic material such as steel, which sections substantially enclose coil 2 except for the inner side 2a thereof facing the longitudinal axis of the separator. Sections 3–6 and 4 constitute oppositely acting pole members. Section 3 and the central portion of section 4 define between them inside the coil 2 a magnetizing space 28 wherein a substantially vertically directed magnetic field is produced for effecting the described separation treatment of slurries in a matrix container disposed in this space. In a typical configuration, where coil 2 possesses electrical characteristics as specified above, space 28, which is cylindrical in form, may have an approximate height of about 20 inches and approximate diameter of 32 inches. A field of the order of 20,000 gauss is sustainable near the pole members with these indicated parameters. Lower field intensities such as hereinabove described can, of course, be maintained in space 28 by suitable adjustment of coil current, and higher intensity fields can similarly be attained within the electrical operating limits of the coil, attendant power supplies, etc. In any event, the magnetic field in the matrix between the pole members is to be maintained at an average or mean intensity of at least 7,000 gauss, and preferably at a considerably higher strength as above pointed out, throughout the container matrix in which separation is effected.

A container 7, termed a canister, or optionally a plurality of canisters of smaller diameter, is disposed within space 28 after having been packed with elongate ferromagnetic elements of less than 50 micron diameter constituting the matrix 19 within which actual separation is effected. The canister 7, in general, comprises a hollow cylindrical container 29 which may, for example, have a volume typically on the order of 70 gallons, and having a cover 30 fitted on the top thereof and secured thereto by bolts 32 extending through adjacent flanges formed on container and cover. A feed inlet tube 8 extends from a funnel-like portion 33 formed in the bottom of container 29 to a coupler 10 whereat a connection is made to tube 9 and thus to flow control system 35. A similar funnel-like portion 34 is formed in cover 30, with a product outlet tube 11 extending therefrom to coupler 12 whereat connection is made to tube 13 and thence back into the flow control system. It may be noted that upon disconnection of couplers 10 and 12 and removal of section 3, canister 7 may itself be readily enabled. The walls and cover of the canister 7 itself may be made of any of a variety of non-magnetic materials, for example, of a non-magnetic metal, or of a tough plastic material such as PVC plastic or the like. Preferably the aspect ratio, which is the ratio of the diameter to the height, of the canister 7 in the magnetizing space of the separator is not less than 0.4 and may typically be 1.5, 1.8 or even 2.0 or greater. The determination of the desired aspect ratio is, of course, a matter of balancing the hydrodynamic difficulties of larger diameters with the economic advantages and efficiency of larger diameters and limited height from a magnetic standpoint.

The feed inlet tube 8 is seen to extend along the longitudinal axial of canister 7 for substantially the height of the canister, and to include a series of holes 8a. Slurry fed into the tube 8 is accordingly discharged in canister 7 at points only slightly displaced from the axis of the container. The flow of such slurry thereupon proceeds in generally radial fashion, outward through matrix 19, which is bounded by a cage 28a, of stainless steel or the like. Gage 28a is slightly spaced from the adjacent wall of container 29 so as to provide a small, relatively uniform space between the cage and adjacent wall of container 29 so as to provide a small, relatively uniform space between the cage and adjacent wall of the container whereat relatively uniform fluid pressure may be maintained. Cage 28a can, of course, be replaced by equivalent structures, such as a perforated can, or so forth. The slurry flow upon reaching points near the outside diameter (O.D.) of the canister accordingly passes upwardly along the general path indicated by arrows 61; which is to say that the upward flow proceeds approximately along the outer edge of matrix 19. The flow then proceeds about the edges 62 of circular plate 63, which is preferably of a ferromagnetic material, and then passes into funnel-like portion 34 and outlet tube 11.

Matrix 19, which is closely packed throughout canister 7, comprises a mass of myriad elongate ferromagnetic elements of less than 50micron diameter presenting in varying degrees surface irregularities, with each element contacting yet also spaced from others so as to constitute a flux conductive collecting matrix of the nature specified in the general description. In the illustrated embodiment, the matrix is preferably a mass of fine self-supporting filamentary material such as stainless steel fibers of less than 50 micron diameter compacted in and filling the space in the container. An especially advantageous collecting matrix may be obtained by use of a so-called "fine" or "medium" grade of commerically available No. 430 stainless steel fibers, employed in conjunction with sintered wool or stainless steel fibers having an average diameter of 50 microns or less. Because the collection agencies are possessed of myriad strands having innumerable bends or turns and other surface irregularities, a vast number of collection points is provided by localized concentrations of the magnetic flux when the matrix is magnetized as herein described, and the field direction and gradients at such points vary enormously. The steel fiber matrix, moreover, provides a relatively large amount of open space, which, however, is so extensively interspersed by and between the fibers that the slurry traversing the canister 7 is diverted into and through multitudinous flow courses having extremely narrow widths between the bordering magnetized fiber strands. Accordingly, a relatively large volume of minute magnetic particles can be collected onto the strands before the flow of the slurry need be discontinued for flushing of the collected particles out of the canister.

For maximum efficiency the stainless steel fiber matrix is compacted in the container to a maximum extent consistent with allowing the desired flow of slurried kaolin particles through the matrix without objectionable stoppages or clogging of the matrix. It has been found effective to use compressed stainless steel fibers, the strands of which occupy from 0.5 to 30% of the volume of the canister space. While the stainless steel fibers or other matrix is described as being placed in canister 7 for convenience, it should be recognized that if the magnetizing space 28 is enclosed by suitable walls, a removable canister need not be used and the collection matrix may be placed in the magnetizing space 28.

The matrix is seen to be in contact at its opposite ends with the pair of conical pole pieces 65 and 67, which in turn are mounted in funnel-like portion 33 and 34 by pins 69 and 71, and form part of the magnetic circuit. At the slurry input end of apparatus, tube 8 passes through a central hole in pole piece 65 and a fiberglass spacer 70 surrounds piece 65 to appropriately position piece 65 and prevent back flow from the container 7. The pole piece 67 at the output end of the container is seen to be mounted so that a slurry flow space 73 remains between such piece and the adjacent wall of portion 34. Pole piece 67 also of course serves in conjunction with plate 63, for smoothly channeling flow from container 7. For purposes of clarity the space 73 is shown on a somewhat exaggerated scale. In practice piece 67 is somewhat wider and higher in a base-to-apex direction, than depicted. The pieces 65 and 67 may be constructed of solid steel or similar ferromagnetic material, or may be formed from a suitable array of steel wool, metallic screens and meshes or the like. These pole pieces serve to concentrate the magnetic field and increase its uniformity in the intervening matrix 19.

The manner of carrying out an efficient separation of weakly magnetic minute particles from a slurry containing them in low concentration with substantially non-magnetic minute particles, such as for the removal of coloring impurities from a kaolin clay, may now be readily comprehended. In particular, a clay-water slurry containing impurities of low magnetic susceptibility is prepared with a solids concentration of about 10 to 40%. With the canister disposed in the space between the pole members 3 and 4, and being subjected to the vertically directed magnetic field between them, the slurry is flowed into the canister 7 via the tube 8 and openings 8a, thence radially through the matrix 19, upwardly along the inside wall of container 29, thence through space 73 and out of the other end of the canister, preferably being pumped upwardly through tube 8 into canister 7 so as to produce a counter flow to the heavier clay particles influenced by gravity. Flow rates are selected by a value at least sufficiently low so that the magnetized matrix within the canister 7 will collect the impurities from the moving slurry. It should be observed that while flow within the canister is principally in the radial direction, substantial flow of the slurry also takes place in random directions. The consequence of such diverse courses of flow and of the concentration of flux patterns at myriad locations in and along them, is that magnetic forces are brought to bear in diverse relationships to the incremental directions of flow and to the orientations of particles in the slurry, and thus the likelihood of capturing a given magnetic particle is much augmented.

It may be observed in connection with the radial flow pattern enabled in the construction of FIG. 1 that, as the slurry flow proceeds in the outward direction from its initial discharge toward the axis of the canister, ever-enlarging cylindrical surfaces are presented to the flow. In consequence, the tendency to clog at a given point from discharge exit is reduced, and greater compression of the matrix material is possible than in an axial flow construction. In turn, this denser packing of matrix material enables capture of smaller particles and promotes uniformity in the flow pattern. A further benefit of the FIG. 1 construction arises by virtue of the fact that the flow velocity decreases as one proceeds outwardly along a radius. In consequence, the last part of the extraction is accomplished with the longest dwell time and with the cleanest matrix material.

Figure 2:
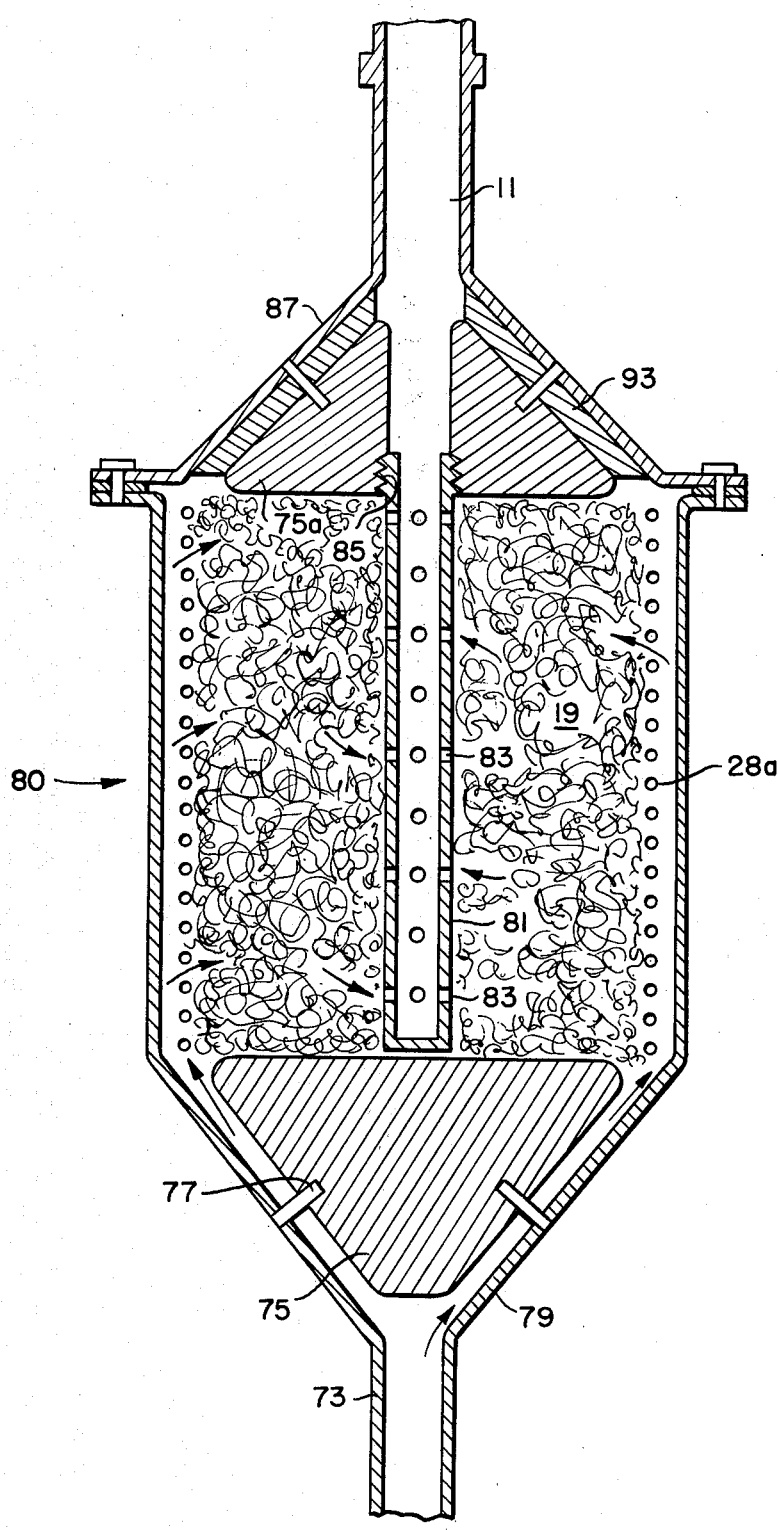
FIG. 2 is a simplified, longitudinal sectional view of the alternate construction for the canister utilized in the FIG. 1 apparatus.

In FIG. 2 a simplified longitudinal sectional view appears of an alternate embodiment of the container 7 of FIG. 1. The container or canister 80 of the present embodiment is in numerous respects similar to container 7, and corresponding elements are identified by corresponding reference numerals. In the present instance slurry flow enters canister 80 via tube 73, however, and is then distributed by flowing about the conical pole piece 75. The latter is secured by pins 77 to funnel-like portion 79, and channels the slurry to the O.D. of canister 80. From such O.D. the slurry then passes through cage 28a which surrounds matrix 19 and proceeds radially inward to the central hollow tube 81. Passing through the holes 83, the slurry enters such tube and thence proceeds from the canister in an upward direction, leaving the canister via tube 11. A second conical pole piece 75a is threadingly engaged with portion 85 of tube 81 and is secured to upper funnel-like portion 87 by pins 77, through an intervening fiberglass collar spacer 93. The pole pieces 75 and 75a are in contact with matrix 19 of stainless steel fiber or other material (as previously discussed), so that the magnetic flux of the magnetic circuit is concentrated at said matrix.

The FIG. 2 canister embodiment will be observed to have a height (i.e., the length of the matrix 19) which considerably exceeds the radius of the said matrix. This is for some applications advantageous in that where such a condition obtains, the said radial device may be packed with a considerably denser material than that used in an axial flow filter of identical dimensions, and yet give the same flow resistance. As has been previously mentioned, by using such augmented density (either by using a material of inherently higher density or by tighter packing), channeling through the material bulk is greatly reduced, which in turn diminishes the rate of degradation of the filter. This capability for increased density, (without detrimental increase in flow resistance) further allows for removal of very fine particles.

The type of radial flow achieved in the FIG. 2 embodiment is, of course, in a radial direction opposite from that of the FIG. 1 apparatus; i.e., in the present case the flow proceeds from the O.D. of the matrix inwardly toward the axis thereof. This has several important consequences. One of these is that the slurry passes through the matrix areas presenting maximum cross-section during the slurry's initial incidence upon such matrix. And it is at such initial incidence that the highest density of contaminant particles are carried, whereby maximum advantage may be taken of the expansive areas of matrix presented. It will furthermore be evident that the radial flow at these cited expansive areas is comparatively slow, whereby increased dwell time is achieved.

Yet another advantage of FIG. 2 embodiment is superior performance during rinsing of the filter. This point will become clearer in connection with the ensuing discussion of FIG. 3. However, it may be noted that as the slurry is introduced on the outer surface of the filter wherein the flow velocity is lowest and removed on the I.D. where the flow velocity is largest, most of the particle build-up on matrix 19 is at the outside. During the flushing of the matrix, advantage may be taken of this situation by flushing from the inside. The particles trapped on the O.D. will thereupon be washed out of the matrix through the shortest path. All of these conditions are particularly important where large diameter machines of the type shown in FIG. 1 are constructed, in that the flow distribution problems become increasingly severe at the larger dimension.

In typical operation of the apparatus of the present invention as described with specific reference to the embodiment shown in FIG. 1, but equally applicable in all substantial principles where the canister of FIG. 2 is utilized, flow of the slurry to be treated is effected upwardly through canister 7 for a period of time with the electromagnet activated thereby effecting collection of magnetics. During this period, the effluent slurry of non-magnetics (product) is let off by tube 13 to a suitable receptacle. After a sufficient volume of magnetics has collected, as may be indicated by observation of a substantial diminution of the extent of purification of the effluent slurry, a two stage flow of water through canister 7 may be initiated. An initial low velocity flow is used, with the matrix still subjected to the magnetic field, to displace residual slurry entrapped or enclosed within the canister and wash some adhering non-magnetic particles from the collected magnetic particles. A so-called "middlings" effluent is thus obtained, which may be collected and reprocessed if desired. Thereafter, the magnetizing of the matrix is discontinued, as by cutting off the current to coil 2, and a high velocity water flow is used to flush retained magnetic particles out of the canister. Detergent-laden water may be employed if desired to assist in the flushing operation.

A flow system, positioned as at 35 in FIG. 1, may be utilized in accordance with the invention to carry out in a completely automatic and pre-programmed manner the operations set forth in the preceding paragraph. A system appropriate to this function is depicted in schematic fashion in FIG. 3. As seen therein the system 40 generally includes a series of electrically activated valves which in response to control signals emanating from system control 41, open or close for predetermined periods to divert and/or direct flow to or from the canister 7. System control 41 includes timing cams and switches to effect activation of the various valves and is also connected via a lead 42 to magnet coil 2, whereby off-on control of the magnetic field is enabled.

During the initial phase of slurry feed, slurry by-pass valve 43 (normally open) is energized so that slurry feed through line 46 is diverted entirely to feed/drain diverter valve 44. The latter is also energized whereby flow is through ports A–B thereof, thence into line 9 and to the bottom inlet of canister 7. Flow out of the canister is via line 11 which connects to the energized valve 47 (normally closed) and thereby to a non-magnetics collection point. Coil 2 of the electromagnet is also activated during this period which typically extends in time for the order of 15 minutes.

During the second phase of the operative cycle, low pressure washing of the canister contents is carried out. With coil 2 still activated, this is effected by inactivating valve 47 and admitting rinse water through low pressure rinse water valve 48, thence via throttle valve 49, line 50 and check valve 51, into tube 11. The exiting rinse water from canister 7 then passes via line 9 and ports A–C of de-energized valve 44 to de-energized valve 45, and via ports A–B to the middlings drain. This "rinse" phase of the operative cycle will typically continue for the order of 2 minutes. While the rinse water, as shown and described, flows opposite to the slurry flow, it may and, indeed, is often preferred to flow in the same direction as the slurry flow to minimize any inadvertent removal of collected magnetic particles.

Figure 3:
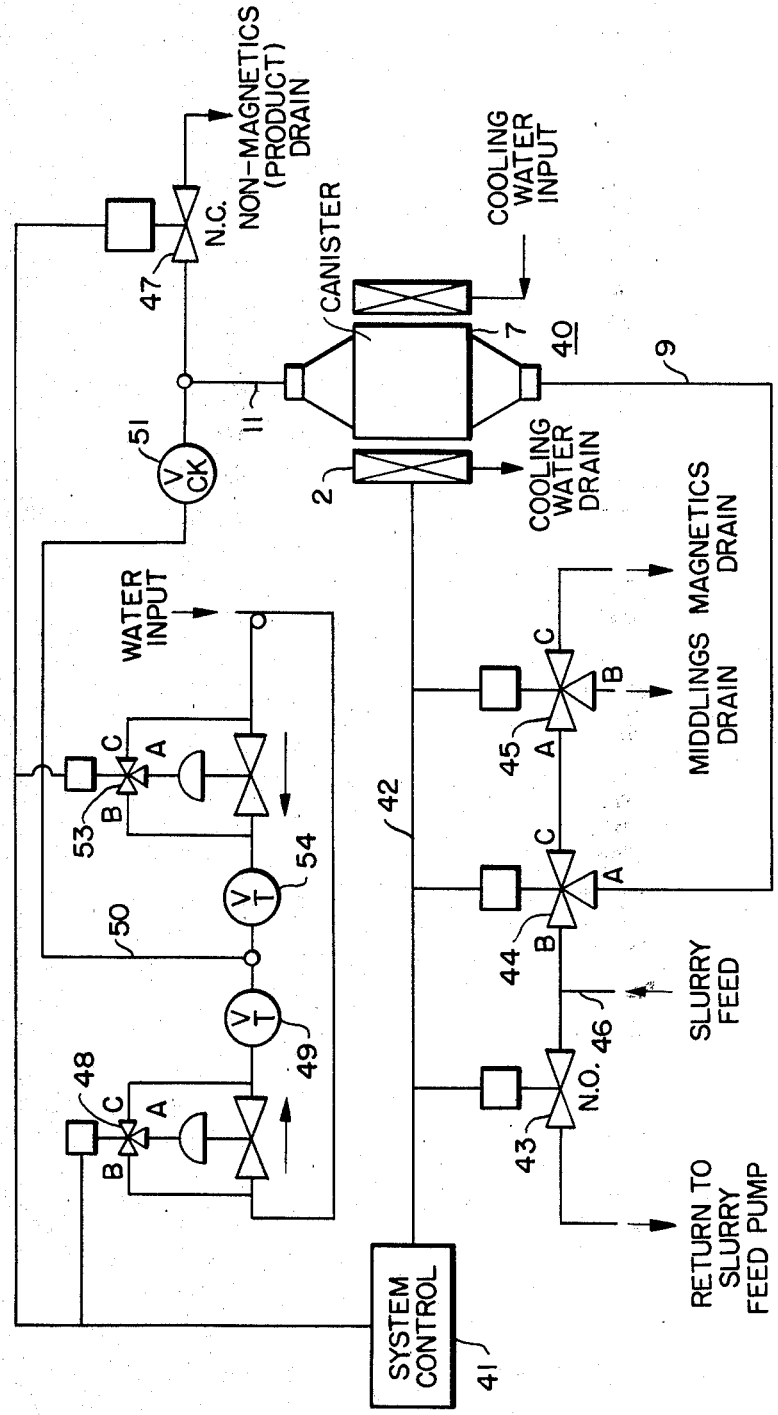
FIG. 3 is a simplified schematic flow diagram, illustrating a flow control system utilized to effect the feed, rinse, and flush portions of an operating cycle in slurry treatment according to the invention.

During the final—"flush"—phase of the operative cycle, coil 2 is inactivated and a high velocity flow of water is established. In FIG. 3, this flow is in the same direction through canister 7 as is utilized for the "rinse" flow phase; i.e., in the direction opposite to the slurry flow—a particularly advantageous arrangement where canister 80 of FIG. 2 is incorporated into apparatus 1. The positioning of the various valve elements is in accord with the description rendered for the rinse phase, except that high velocity flow is admitted into line 50 via the energized pressure regulating valve 53 and throttle valve 54, and valve 45 is now de-energized whereby flow is via ports A–C thereof and to the magnetic drain point. By suitable setting of appropriate valves the flush operation can, of course, also be accomplished with the flow reversed from that in the "rinse" phase; i.e., with flow in the same direction as the slurry flow.

In typical processing of kaolin clays, it is preferred to operate on a cyclic pattern in which clay is fed in slurry form to the magnetic separator for from 5 to 30 minutes. The feeding of kaolin slurry to the separator is then interrupted and the canister and matrix then rinsed with low velocity water for a period of time on the order of ½ to 5 minutes to displace the clay slurry left in the magnetized matrix while not contaminating the kaolin slurry with the magnetics that have been collected. The magnet is then de-energized and the matrix is flushed with high velocity water for approximately 1 to 10 minutes to discharge the collected magnetic particles. Typically, for a separator such as that of FIG. 1, the complete rinse and flush cycle may take approximately 5 minutes.

Numerous advantages of the present invention are readily apparent. The system of the present invention allows the use of high intensity magnetic fields acting on a continuously programmed high volume of slurry, the retention time of which may be varied over a wide range. The high intensity magnetic field produced, while macroscopically homogeneous, induces high field gradients at a multiplicity of points and edges of the elements of a matrix which produces a tortuous flow that meanders in courses extending both lengthwise and transverse to the applied magnetic field. The flow distribution may be further modified by the use of conical flow distribution plugs, baffles, pebble beds and the like to produce the desired flow pattern. The utilization of one hundred percent of the open space of the matrix within the field for slurry treatment during up to 75% of the total operation time, results in high throughputs and efficiency. The matrix elements are typically capable of holding in excess of 25% or in some cases even up to 100% or more of their weight in attracted magnetic particles, which are readily removed when desired by the use of the pressure flush cycle. While capable of operating with high throughputs, the present system operates with low fluid pressure gradients and low drag forces on the submicron particles of the slurry. The system utilizing electromagnetically magnetized pole members can produce the desired results without the use of any moving parts other than the external control valves, thus making it easy to maintain in operation on a commercial basis.

Figure 4:
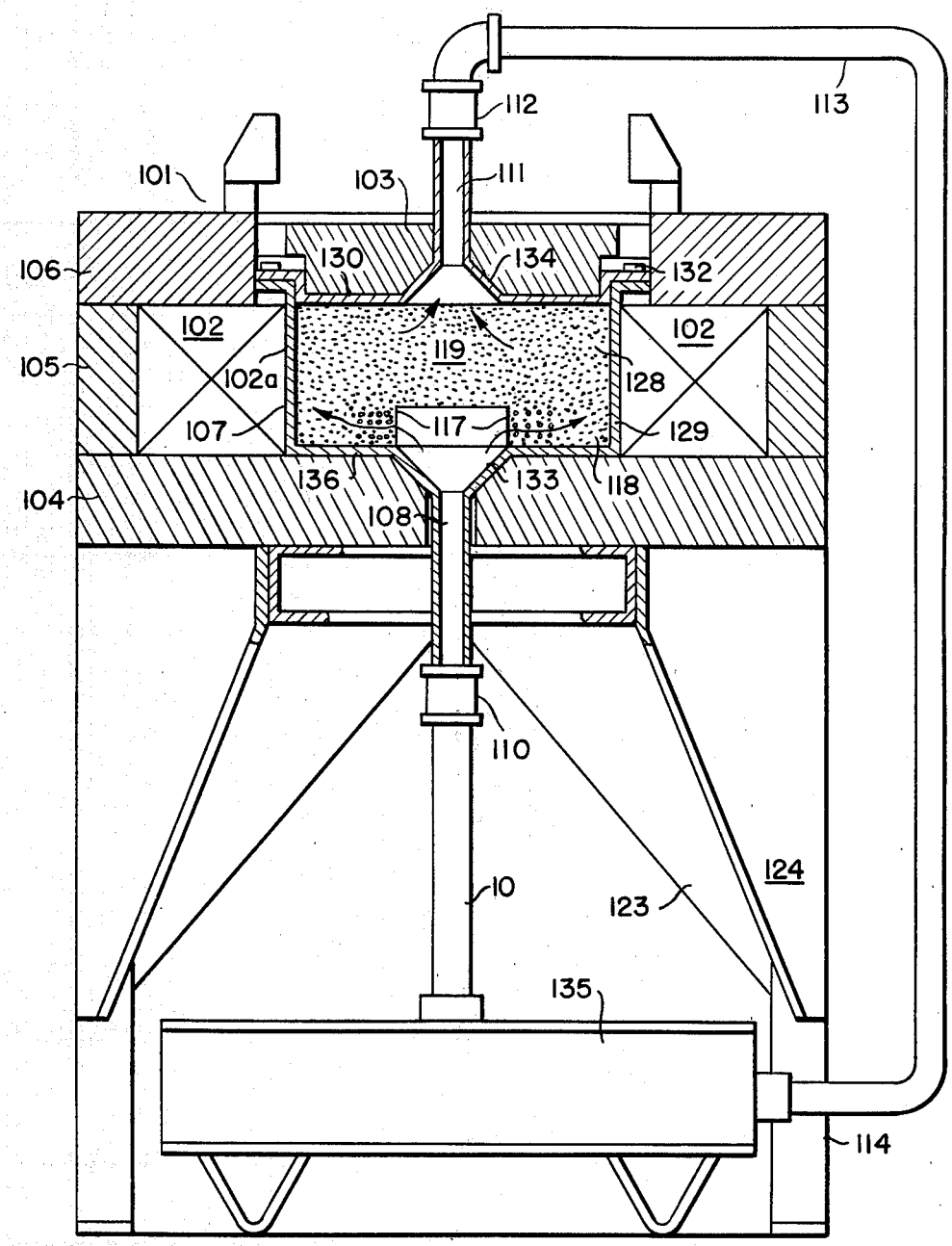
FIG. 4 is a longitudinal cross-section through a magnetic separator generally in accordance with the present invention.

Illustrative of another embodiment of the present invention is the following:

The apparatus shown in FIG. 4, generally designated at 101, includes support legs 114 secured to members 123 and 124, which members in turn support the bulk of the separator. The magnetic field for the separator is preferably produced by means of an electromagnet, the coil for which is designated at 102. In order to provide the high field strengths required in accordance with the invention, coil 102 is adapted for high power dissipation (e.g., of the order of 300 KW at 3,000 amperes D.C.) and will typically comprise a hollow copper conductor, means being present (but not explicitly shown in the drawing) for pumping water or other coolant through the coil under pressure.

The magnetic circuit for apparatus 101 includes a series of cylindrical sections 103, 104, 105 and 106, all made of a ferromagnetic material such as steel, which sections substantially enclose coil 102 except for the inner side 102a thereof facing the longitudinal axis of the separator. Sections 103–106 and 104 constitute oppositely acting pole members. Section 103 and the central portion of section 104 define between them inside the coil 102 a magnetizing space 128 wherein a substantially vertically directed magnetic field is produced for effecting the described separation treatment of slurries in a matrix container disposed in this space. In a typical configuration, where coil 102 possesses electrical characteristics as specified above, space 128, which is cylindrical in form, may have an approximate height of about 20 inches and approximate diameter of 32 inches. A field of the order of 20,000 gauss is sustainable near the pole members with these indicated parameters. Lower field intensities such as herein-above described can, of course, be maintained in space 128 by suitable adjustment of coil current, and higher intensity fields can similarly be attained within the electrical operating limits of the coil, attendant power supplies, etc. In any event, the magnetic field in the matrix between the pole members is to be maintained at an average or mean intensity of at least 7,000 gauss, and preferably at a considerably higher strength as above pointed out, throughout the container matrix in which separation is effected.

A container 107, termed a canister, or optionally a plurality of canisters of smaller diameter, is disposed within space 128 after having been packed with elongate ferromagnetic elements of less than 50 micron diameter constituting the matrix 119 within which acsuitable array of steel wool, metallic screens and meshes, or the like.

Figure 6:
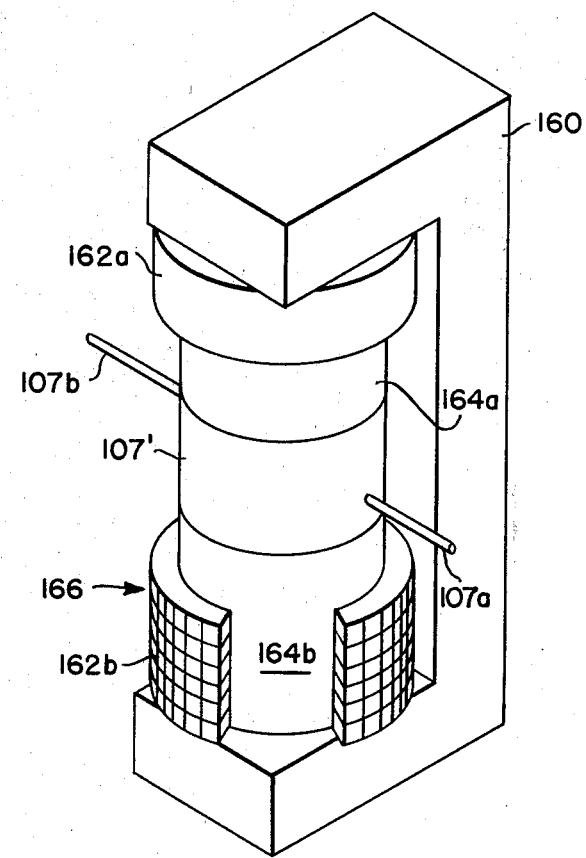
FIG. 6 is a schematic oblique projection, partly in section, of another embodiment of a magnetic separator in accordance with the present invention.

Another embodiment of a magnetic separator in accord with the present invention is shown in FIG. 6. In this embodiment the separator includes a U-, C-, or yoke-shaped supporting means and ferromagnetic flux conductive return frame 160 having vertically disposed opposing pole members 164a and 164b which constitute cores of a high intensity electromagnet indicated generally at 166. The electromagnet in this embodiment comprises like coils 162a and 162b surrounding and supported on the spaced apart magnet poles. The electromagnet 166 is of course provided with suitable, conventional electrical controls and circuits (not shown in FIG. 6) and may be provided with cooling water and similar conventional features of high intensity electromagnets. The even confronting surfaces of the poles 164a, 164b are so spaced apart as to receive and cover the ends of a ferromagnetic collection matrix container 107', similar to canister 107, described above. The collection matrix within container 107', composed of multitudinous elongate ferromagnetic elements as described above, is subjected to the magnetic field produced by energization of the coils 162a, 162b of electromagnet 166 while the container 107' is in working position in the gap between the faces of the pole members 164a, 164b. The slurry enters container 107' through inlet port 107a and proceeds to flow tortuously through the container, being diverted into multitudinous diverse courses by the structure of the collection matrix, while the flux of the magnetic field generated by the energized electromagnet 166 is applied in generally axial direction between the faces of the pole members and at myriad locations within the matrix has locally induced fields resulting therein. The treated slurry exits from the container at outlet 107b. The substantially axial magnetic field applied is one of high intensity as above described having an average intensity of at least 7,000 gauss in the matrix from end to end of container 107' between the pole members 164a, 164b. The desired conditions of the flow of the slurry are as described above.

After the predetermined period of slurry flow through the matrix, during which time the magnetically more susceptible components of the slurry are being collected on the matrix, the slurry flow is discontinued and the residual slurry is then rinsed out of container 107', while still subjecting the matrix to the magnetic field, by flowing water through the container sufficiently gently to leave the collected particles on the magnetized matrix elements. Following the completion of this rinsing cycle, the energization of coils 162a, 162b and electromagnet 166 is discontinued and the collected particles are flushed from the container 107' by a stronger flow of water therethrough. The several effluents from the container are collected separately and obtained in a manner such as described hereinafter with specific reference to the embodiment shown in FIG. 3.

As discussed throughout, the preferred matrix is composed of ultrafine stainless steel fibers, in general, having a filament diameter of less than 50 microns and preferably in the range of 0.5 microns to 40 microns. Such materials are commercially available from the Metal Fiber Division of Brunswick Corporation, Chicago, Ill.

Improvements reached with 25 micron fibers at 4% occupied volume are equivalent or superior to the 6% occupied volume, medium stainless steel wool packing. Medium stainless steel wool is the finest magnetic steel wool available commercially.

A 6% packing with the ultrafine fiber matrix is capable of producing a higher composite brightness than a 12% packing of conventional medium grade stainless steel wool. Data also indicates that much higher production rates can be realized using the ultrafine fibers in lieu of medium grade wool at 6% canister packing density. A clay sample processed through a 25 micron wool at 1 minute retention time produced a higher brightness than an identical sample processed through medium grade wool at a 2 minute retention time.

Data indicates that use of a 6% ultrafine fiber matrix is capable of greatly increasing (perhaps as much as doubling) production rates without a sacrifice in brightness enhancement. Further, it is to be noted that extensive use of a 6% ultrafine fiber matrix does not produce any noticeable cleanout or distribution problems.

It is to be noted that the brightness improvements gained with the 25 micron fibers at 3% occupied volume superior to a 9% packing density of conventional medium grade wool. A 6% occupied volume with 25 micron metal fibers produced better results than a 12% packing density of conventional medium grade wool.

It is also possible to employ the ultrafine stainless steel wool strands in forms which are mechanically woven, compressed, or sintered to provide structural integrity. Such structural integrity, of course, offers the additional advantage of preventing loss of loose fibers when the wool is externally washed. The sintering process involves the heating of the matrix body near the melting point of the material whereby the individual strands become physically bonded to one another and provide the desired structural integrity.

Ultrafine fibers; i.e., less than 50 micron diameter, are produced in such a manner as to allow for the orientation of the fibers with respect to the field and many are produced by processes which tend to produce smooth fibers rather than those having sharp edges which in certain applications may make the matrix easier to clean. Such fibers also provide the same surface area with less loading or occupation of the volume and seem in many cases to have the ability to remove the desired particles better. Because of the smooth configuration of many such fibers, there is less undesired knitting together and a greater tendency to release the trapped particles while washing out. Because many such ultrafine fibers are produced in longer strands, there is less loss of short fibers and a shorter flush length is possible. The ultrafine fibers also have a high Young's modulus, on the order of 30 million, which coupled with their diameter, imparts great flexibility to the metal yarn which may be put in almost any textile form as well as otherwise wound or oriented to produce the desired results for magnetic separation.

Of particular utility are the needle punched brunsmet web of Type 430 stainless steel having a 25 micron fiber diameter, although magnetic metal fibers from 0.5 to 40 microns provide magnetic collection matrices superior to the existing stainless steel matrices.

Figure 7:
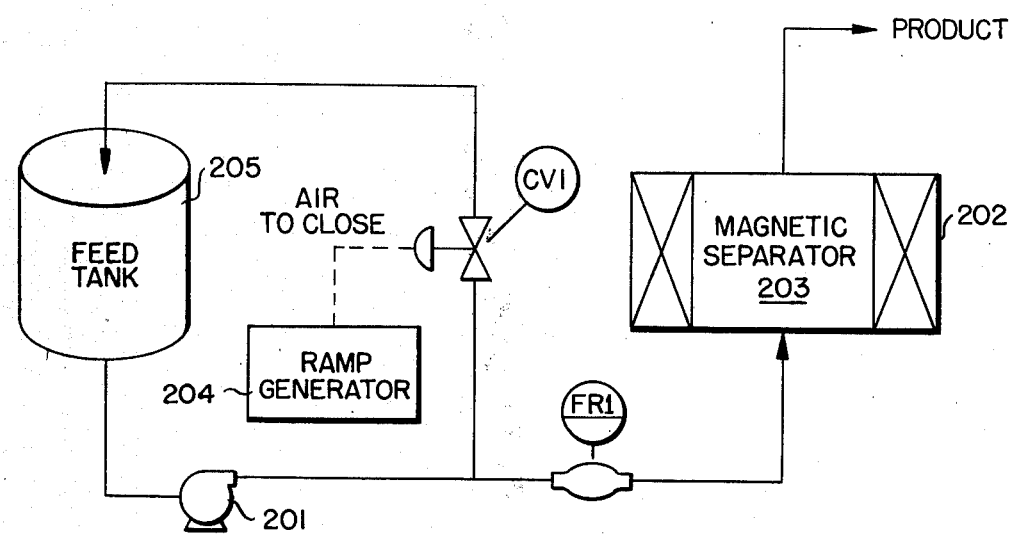
FIG. 7 is a schematic representation of the system to produce the integrated feed cycle of the present invention.

FIG. 7 shows in schematic fashion the system for producing integrated feed in accordance with the present invention.

At the beginning of the feed cycle, the bypass control valve CV 1 is closed, thereby forcing the full output from the positive displacement feed pumps 201 through the separator 202 canister 203. As the feed cycle progresses, the ramp generator 204 (such as a Foxboro tual separation is effected. The canister 107, in general, comprises a hollow cylindrical container 129 which may, for example, have a volume typically on the order of 70 gallons, and having a cover 130 fitted on the top thereof and secured thereto by bolts 132 extending through adjacent flanges formed on container and cover. A feed inlet tube 108 extends from a funnel-like portion 133 formed in the bottom of container 129 to a coupler 110 whereat a connection is made to tube 109 and thus to flow control system 135. A similar funnel-like portion 134 is formed in cover 130, with a product outlet tube 111 extending therefrom to coupler 112 whereat connection is made to tube 113 and thence back into the flow control system. It may be noted that upon disconnection of couplers 110 and 112 and removal of section 103, canister 107 may itself be readily removed from apparatus 101, whereby servicing thereof is readily enabled. The walls and cover of the canister 107 itself may be made of any of a variety of non-magnetic materials, for example, of a stainless steel or of a tough plastic material such as a PVC plastic or the like. Preferably the aspect ratio, which is the ratio of the diameter to the height, of the canister 107 in the magnetizing space of the separator is not less than 0.4 and may typically be 1.5, 1.8 or even 2.0 or greater. The determination of the desired aspect ratio is, of course, a matter of balancing the hydrodynamic difficulties of larger diameters with the economic advantages and efficiency of larger diameters and limited height from a magnetic standpoint.

Closely packed throughout canister 107 is a matrix 119 comprising a mass of myriad elongate ferromagnetic elements having a fiber diameter of 50 microns or less presenting in varying degrees surface irregularities, and each contacting yet also spaced from others so as to constitute a flux conductive collecting matrix of the nature specified in the general description. In the illustrated embodiment, the matrix is a mass of fine self-supporting filamentary material such as stainless steel fibers of 25 microns compacted in and filling the space in the container. An especially advantageous collecting matrix may be obtained by use of a so-called commercially available No. 430 stainless steel fibers in varying combinations less than 50 micron diameters. Because the steel fibers are possessed of myriad strands having innumerable bends or turns and other surface irregularities, a vast number of collection points is provided by localized concentrations of the magnetic flux when the matrix is magnetized as herein described, and the field direction and gradients at such points vary enormously. The steel fiber matrix, moreover, provides a relatively great amount of open space which, however, is so extensively interspersed by and between the fibers that the slurry traversing the canister 107 is diverted into and through multitudinous flow courses having extremely narrow widths between the bordering magnetized fiber strands. Accordingly, a relatively large volume of minute magnetic particles can be collected onto the strands before the flow of the slurry need be discontinued for flushing of the collected particles out of the canister.

For maximum efficiency a stainless steel fiber matrix is compacted in the container to a maximum extent consistent with allowing the desired flow of slurried kaolin particles through the matrix without objectionable stoppages or clogging of the matrix. It has been found effective to use compressed fine stainless steel fibers, the strands of which occupy from 0.5 to 30% of the volume of the canister space.

While the stainless steel fibers or other matrix is above described as being placed in a canister 107 for convenience, it should be recognized that if the magnetizing space 128 is enclosed by suitable walls, a removable canister need not be used and the collection matrix may be placed directly in the magnetizing space 128.

The manner of carrying out an efficient separation of weakly magnetic minute particles from a slurry containing them in low concentration with substantially non-magnetic minute particles, such as for the removal of coloring impurities from a kaolin clay, may not be readily comprehended.

A clay-water slurry containing impurities of low magnetic susceptibility is prepared with a solids concentration of about 10 to 40%. With the canister disposed in the space between the pole members 103 and 104 and being subjected to the vertically directed magnetic field between them, the slurry is flowed into the canister 107 at one end thereof and thence through the matrix 119 and out of the other end of the canister, preferably being pumped upwardly through tube 108 into canister 108 so as to produce a counter flow to the heavier clay particles influenced by gravity. Flow rates are selected at a value at least sufficiently low so that the magnetized matrix within the canister 107 will collect the impurities from the moving slurry.

As the slurry enters the canister 107, it follows the flaring walls of port 133. It may initially be passed through a pebble bed 136 to provide a more uniform flow distribution for the slurry. Alternatively, a cone structure such as shown at 120 in FIG. 5 or a plurality of such structures may be employed to produce the desired flow distribution. The flow of the slurry thereafter meanders tortuously through the matrix 119 although, if desired, additional flow control means may be optionally employed to produce specific flow patterns. A typical incremental path or course of the slurry flow is indicated schematically at 118. It should be observed that while net flow is indeed in the vertical direction of the magnetic field, substantial flow of the slurry also takes place in random directions including directions transverse to the field direction. The consequence of such diverse courses of flow and of the concentration of flux patterns at myriad locations in and along them is that magnetic forces are brought to bear in diverse relationships to the incremental directions of flow and to the orientations of particles in the slurry, and thus the likelihood of capturing a given magnetic particle is much augmented.

Figure 5:
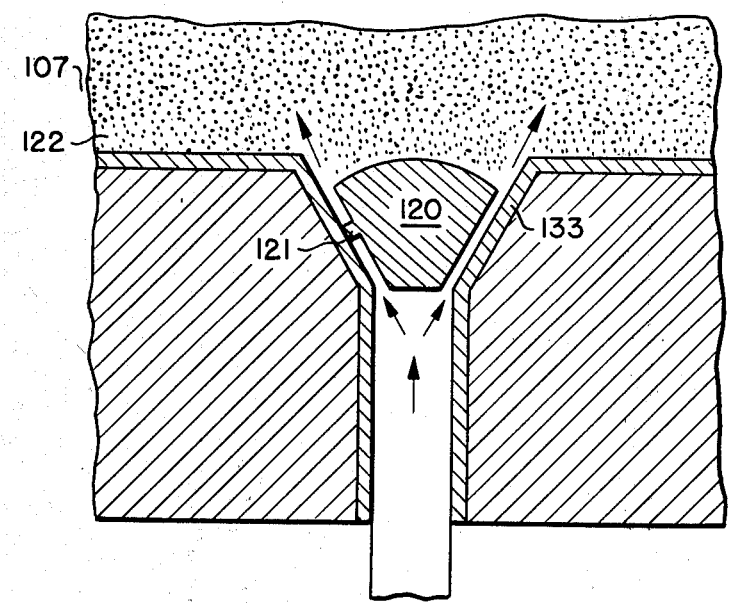
FIG. 5 is a partial, longitudinal sectional view of a structure useful as a portion of the apparatus.

In FIG. 5, a variant construction for the ports leading to and from the canister 107 is partially depicted. In this construction a conical steel cone plug 120 is present in each funnel-like port 133 or 134, said plug 120 being supported in spaced relationship from the outer conical wall of port 133 or 134 by ridges such as that at 121. The said plugs 120 constitute segments of the pole members, and they directly contact a mass of steel wool 122 contained in the canister so as to provide a pathway for conducting magnetic flux into the matrix. In addition to thereby lowering magnetic reluctance in the field, the steel plugs 120 serve to distribute the flow in the canister 107 to thereby establish flow patterns such as are described in connection with FIG. 4. The flow pattern may be further altered and controlled by the use of a plurality of cone plugs 120 at each end of a canister.

Cone plugs 120 may be constructed of solid steel or similar ferromagnetic material or may be formed from a Model 2AP-RPG) slowly opens CV 1 allowing clay to recirculate to the feed tank 205, thereby reducing the flow through the canister 203.

The ramp generator 204 may be connected by well known means to the master program timer or controller which is itself any one of such well known and conventional means such as a mechanical, pneumatic electronic, or digital master programming means.

Figure 8:
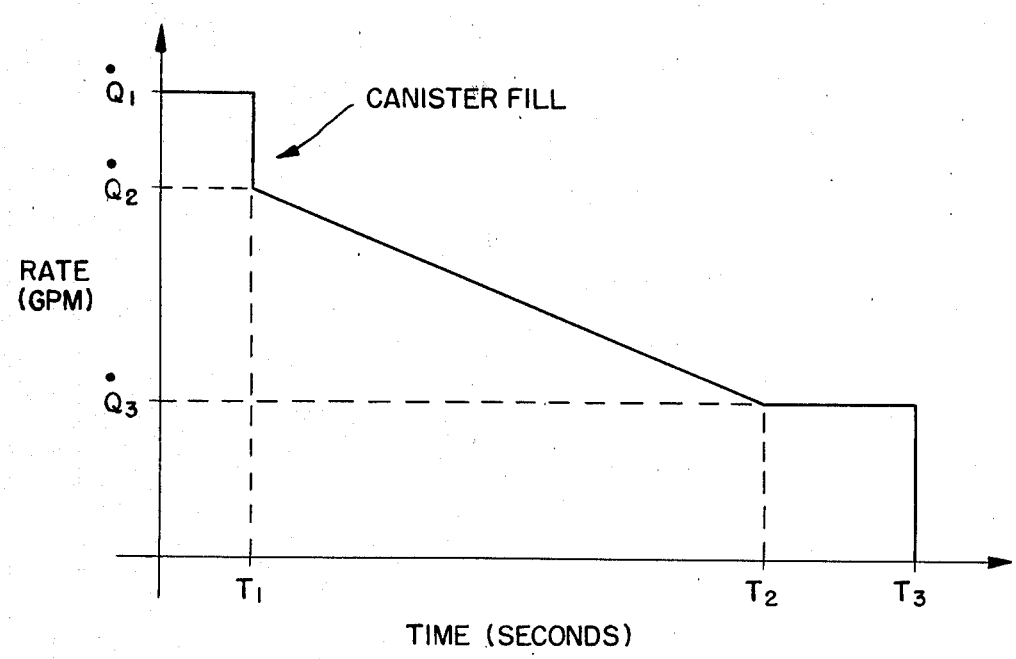
FIG. 8 is a schematic representation of the integrated feed cycle of the present invention.

As shown in FIG. 8, the integrated feed cycle consists of filling the canister at an initial fill rate $\dot{Q}_1$, reducing the flow rate to an initial feed rate $\dot{Q}_2$ at $T_1$ and starting the ramp generator decrease in flow rate at that time $T_1$ till ramp stop $T_2$ and continuing the flow at the final feed rate $\dot{Q}_3$ from ramp stop $T_2$ to the end of the feed cycle $T_3$. The production per cycle is the product:

$$\dot{Q}_3(T_3-T_1)+(\dot{Q}_2-\dot{Q}_3)(T_2-T_1)/2$$

and the canister fill period is 0 seconds to $T_1$ at fill rate $\dot{Q}_1$.

Figure 9A:
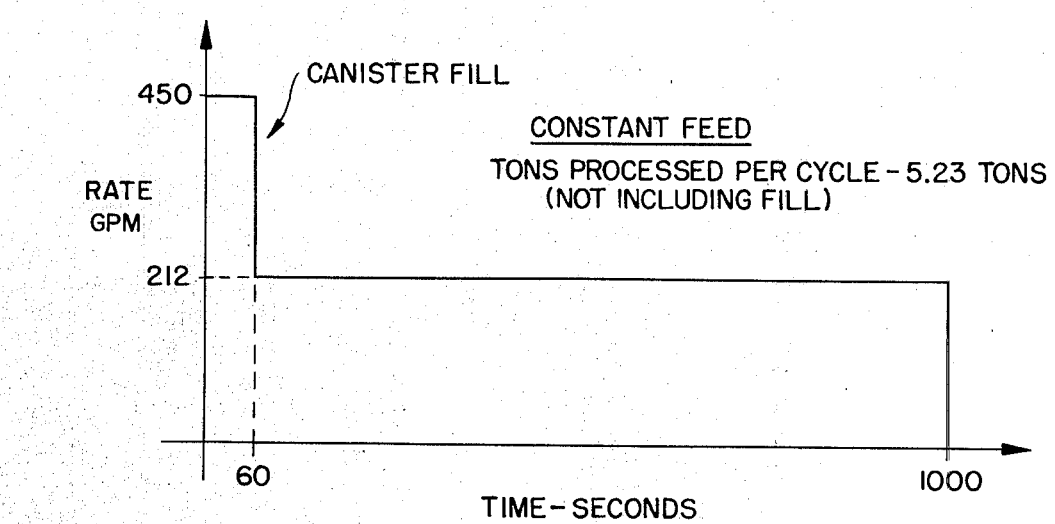
FIGS. 9(a) and 9(b) are a comparison of the constant feed cycle (a) with the integrated feed cycle (b) of the present invention.

FIG. 9(a) shows a constant feed cycle modified to provide for fast canister fill at 450 GPM and a feed rate of 212 GPM to produce 5.23 tons per cycle (not including the fill slurry).

Figure 9B:
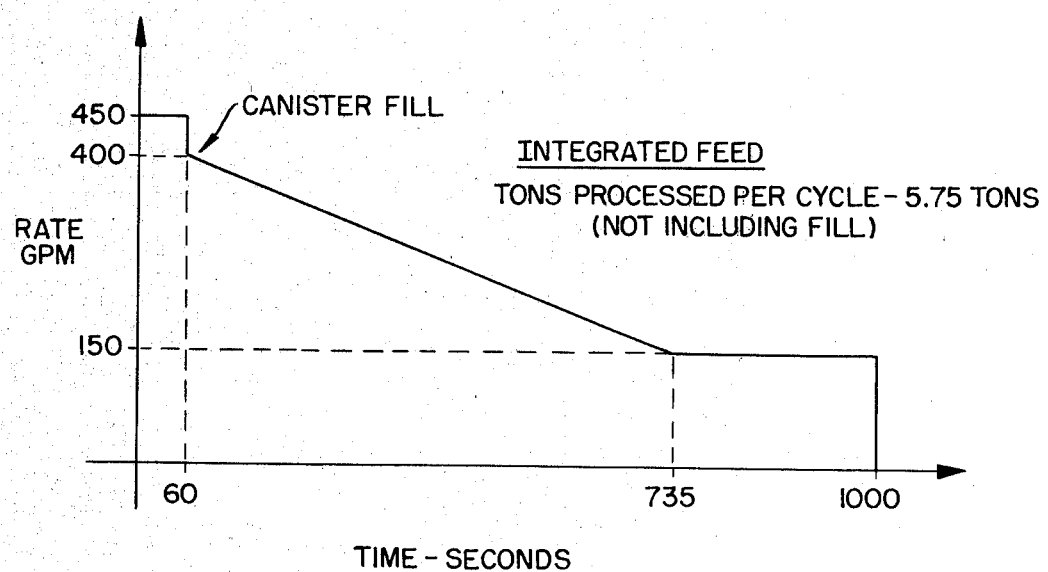

FIG. 9(b) shows an integrated feed cycle with canister fill at 450 GPM and a ramp generator initial flow at 400 GPM decreasing to 150 GPM at 735 seconds, continuing at that rate till 1000 seconds, to produce 5.75 tons per cycle (not including the fill slurry).

The following examples were conducted on a 63 cubic foot magnetic separator packed at approximately 6% occupied volume with medium grade 430 stainless steel wool. The magnetic field strength was approximately 17,000 gauss. The solids content of the feed was approximately 27%. The Brookfield viscosity was less than 10 centipoises. The results are shown in Table I below:

TABLE I

COMPARISON OF CONSTANT AND INTEGRATED FEED PROGRAMS

| Test | Magnetically Beneficiated Product | Constant Feed Program | | Integrated Feed Program | |
|---|---|---|---|---|---|
| | | Brightness Increase, pts. | Production Rate, tph | Brightness Increase, pts. | Production Rate, tph |
| I | Hydrasperse ® 90 | 3.2 | 9.7 | 3.3 | 11.7 |
| II | Hydrasperse 90 | 3.4 | 7.9 | 3.5 | 9.5 |
| III | Hydrasperse 90 | 4.2 | 9.3 | 4.2 | 11.2 |
| IV | Hydrasheen ® 90 | 3.3 | 8.7 | 3.3 | 10.3 |
| V | Hydraprint ®* | 4.8 | 7.1* | 4.8 | 8.2* |

*Rates are lower due to quantity of magnetic discolorants in feed clay.

Hydrasperse, Hydrasheen, and Hydraprint are registered trademarks of J. M. Huber Corporation.

It is to be noted that equivalent brightness products were obtained at higher production rates by approximately 20% with the integrated feed program.

When employing the constant flow program, the brightness improvement decreased with time as the matrix became saturated. Employing the integrated feed program of the present invention, the initial slurry brightness was somewhat lower than with the constant flow program; however, the product brightness remained essentially constant as the flow rate was decreased, resulting in an improved or equivalent composite product brightness thereby allowing an increase in production capacity by the integrated feed method of the present invention.

In general, the integrated feed program of the present invention provides for the conjunction of the following advantages: (1) a faster fill time with less down (nonproductive) time, (2) a clean matrix at the time of the highest flow rate with lower flow rates provided as the collection sites become filled toward the end of the cycle, and (3) a higher composite brightness from the over-all process, thus allowing for an increase in production rates at the same brightness level or the production of a higher brightness product at the same production rate.

It is preferred that the initial flow rate be not more than approximately three (3) times the final flow rate; however, in principle any pattern of flow rates in which the integrated area under the curve is equal to the volume of production found satisfactory by the constant flow method may be employed to like ends in accordance with the present invention.

While the present invention has been described with reference to specific embodiments, this application is intended to cover those various changes and substitutions which may be made from those skilled in the art without departing from the spirit and scope of the appended claims.

We claim:

1. In a method for increasing the production or efficiency of a process in which a fluid is passed over or through a column containing a matrix, or array of elements to remove or change a component of the fluid or the fluid, wherein the efficiency decreases as the matrix or elements become saturated or degenerate in effectiveness with time and/or the passage of fluid over or through said matrix or array of elements; the improvement comprising operating the method using an integrated feed cycle and comprising the following steps:
   (a) passing said fluid into said column at an initial flow rate $Q_1$ until said column is full;
   (b) reducing the flow rate to an initial feed rate $Q_2$ at $T_1$;
   (c) decreasing said flow rate over a time period of from $T_1$ to $T_2$ to a final feed rate $Q_3$ and maintaining the feed rate $Q_3$ to the end of the feed cycle time at $T_3$;
   wherein $Q_1$ is the initial flow rate, $Q_2$ is the initial feed rate, and $Q_3$ is the final feed rate, $T_1$ is the time until the initial feed rate begins, $T_2$ is the time until the feed rate decreases, and $T_3$ is the time at the end of the feed cycle; and wherein $Q_1$ is not more than three times $Q_3$, and $Q_3$ is lower than $Q_2$, and wherein the process is conducted over a period of time such that the integration of the flow rate with respect to time yields a volume of product greater than or equal to the volume which would be produced at a constant flow rate for such product.

2. The method of claim 1 wherein the flow rate is decreased between times $T_1$ and $T_2$ at the rate shown in FIG. 8.

3. The method of claim 1 wherein the fill rate is about 450 GPM, the initial fill rate is about 400 GPM, and the flow rate decreases to a rate of about 150 GPM over a time period of about 60 to 735 seconds and continuing at the 150 GPM rate for an about an additional 1000 seconds.

4. In a method for increasing the production or brightness of a product produced by magnetic separation in a process wherein a fluid is passed over or through a column containing a matrix, or array of elements to remove magnetically susceptible minute particles from the fluid, wherein the efficiency decreases as the matrix or elements become saturated or degenerate is effectiveness with time and/or the passage of fluid over or through said matrix or array of elements; the improvement comprising operating the method using an integrated feed cycle and comprising the following steps:
(a) passing said fluid into said column at an initial flow rate $Q_1$ until said column is full;
(b) reducing the flow rate to an initial feed rate $Q_2$ at $T_1$;
(c) decreasing said flow rate over a time period of from $T_1$ to $T_2$ to a final feed rate $Q_3$ and maintaining the feed rate $Q_3$ to the end of the feed cycle time at $T_3$;
wherein $Q_1$ is the initial flow rate, $Q_2$ is the initial feed rate, and $Q_3$ is the final feed rate, $T_1$ is the time until the initial feed rate begins, $T_2$ is the time until the feed rate decreases, and $T_3$ is the time at the end of the feed cycle; and wherein $Q_1$ is not more than three times $Q_3$, and $Q_3$ is lower than $Q_2$, and wherein the process is conducted over a period of time such that the integration of the flow rate with respect to time yields a volume of product greater than or equal to the volume which would be produced at a constant flow rate for such product.

* * * * *

UNITED STATES PATENT AND TRADEMARK OFFICE
CERTIFICATE OF CORRECTION

PATENT NO. : 4,356,093
DATED : October 26, 1982
INVENTOR(S) : WILLIAM F. ABERCROMBIE, JR., et al.

It is certified that error appears in the above—identified patent and that said Letters Patent is hereby corrected as shown below:

Column 2, line 65, following "in particular", a comma -- , -- should be inserted.

Column 3, line 6, "in particular" should be -- In particular --.

Column 7, line 23, "axial" should be -- axis --.

Column 7, line 30, "Gage" should be -- Cage --.

Column 8, line 65, "by" should be -- at --.

Column 14, line 21, "canister 108" should be -- canister 107 --.

Column 16, line 21, preceding "superior", the word -- were -- should be inserted.

Signed and Sealed this

Eighteenth Day of January 1983

[SEAL]

Attest:

Attesting Officer

GERALD J. MOSSINGHOFF

Commissioner of Patents and Trademarks